Figure 1:
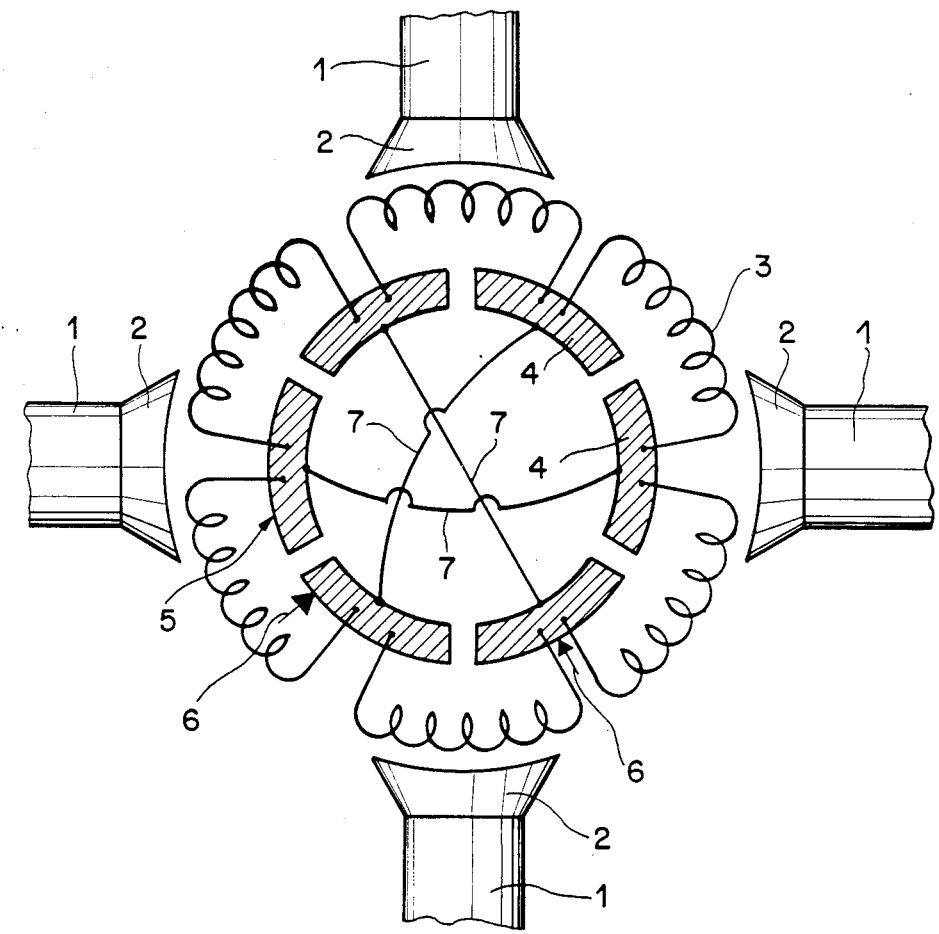

United States Patent [19]

Heyraud

[11] Patent Number: 4,716,330
[45] Date of Patent: Dec. 29, 1987

[54] DC MOTOR WITH COMMUTATOR ROTOR

[75] Inventor: Marc Heyraud, La Chaux-de-Fonds, Switzerland

[73] Assignee: Asgalium S.A., Switzerland

[21] Appl. No.: 795,082

[22] Filed: Nov. 5, 1985

[30] Foreign Application Priority Data

Nov. 19, 1984 [EP] European Pat. Off. ........ 84810559.9

[51] Int. Cl.$^4$ ............................................ H02K 13/10
[52] U.S. Cl. ...................................... 310/233; 310/42; 310/43; 310/46
[58] Field of Search ...................... 310/46, 43, 42, 233, 310/254, 234, 235, 261, 236, 237; 19/507, 597

[56] References Cited

U.S. PATENT DOCUMENTS

| | | | |
|---|---|---|---|
| 2,672,564 | 3/1954 | Krasno | 310/236 |
| 3,036,165 | 5/1962 | Kallin | 310/236 |
| 3,136,906 | 6/1964 | Fagel | 310/237 |
| 3,193,714 | 7/1965 | Hoven | 310/236 |
| 4,425,536 | 1/1984 | Larsen | 310/233 |

FOREIGN PATENT DOCUMENTS

| | | | |
|---|---|---|---|
| 0550157 | 8/1956 | Belgium | 310/236 |
| 0082678 | 11/1919 | Switzerland | 310/233 |
| 0626458 | 9/1978 | U.S.S.R. | 310/236 |

Primary Examiner—R. Skudy
Attorney, Agent, or Firm—Parkhurst & Oliff

[57] ABSTRACT

The commutator of the motor is made up of three parts assembled coaxially and insulated from one another. Each part is connected to one of the windings of the rotor. The parts are blanked from a sheet of metal, preferably silver, with a flat annular zone, an inner lug, and radial fingers which are subsequently all bent at a 90° angle at the same side of the annular zone. The parts are fitted into each other in such a way that the fingers of the different parts are seated around the circumference of the commutator.

8 Claims, 7 Drawing Figures

PROIR ART

DC MOTOR WITH COMMUTATOR ROTOR

This invention relates to electric motors, and more particularly to a DC motor of the type including a stator having several pairs of poles and a rotor having a commutator, the latter comprising a set of elongated elements distributed about the axis of the rotor in groups of interconnected elements, the number of elements in each group being equal to the number of pairs of poles of the stator.

A need exists at present for DC motors in which the stator comprises a large number of pairs of poles. Moreover, this need is felt especially in the design of very small motors. For example, in the case of a motor having a coreless rotor with a skew winding, as described and illustrated in West German Pat. No. 1,188,709 to Fritz Faulhaber, it is advantageous to have a large number of poles when it is desired to reduce the length-to-diameter ratio of the rotor. In the case of a motor having a flat rotor, it is obvious that an efficient rotor cannot be obtained unless there are a large number of radial portions of the wires. This leads to inefficient coil ends if the number of pairs of poles is not increased parallel thereto.

However, the production of rotors adapted to stators having a large number of pairs of poles encounters difficulties as concerns the make-up of the commutator; for the conventional design of commutators for DC motors consists in assembling the necessary number of segments on a cylinder so that these segments are insulated from one another and oriented parallel to the axis of the motor.

It is an object of this invention to provide an improved DC motor comprising a commutator rotor designed to overcome the aforementioned problem by means of a commutator which has fewer parts, is easy to manufacture with the required precision, and can be miniaturized.

To this end, in the DC motor according to the present invention, of the type initially mentioned, the elements of each group are integral with one another and joined by rigid annular portions in such a way as to form separate commutator parts, the commutator being formed of a number of such parts equal to the number of coils per pair of poles.

Figure 3:
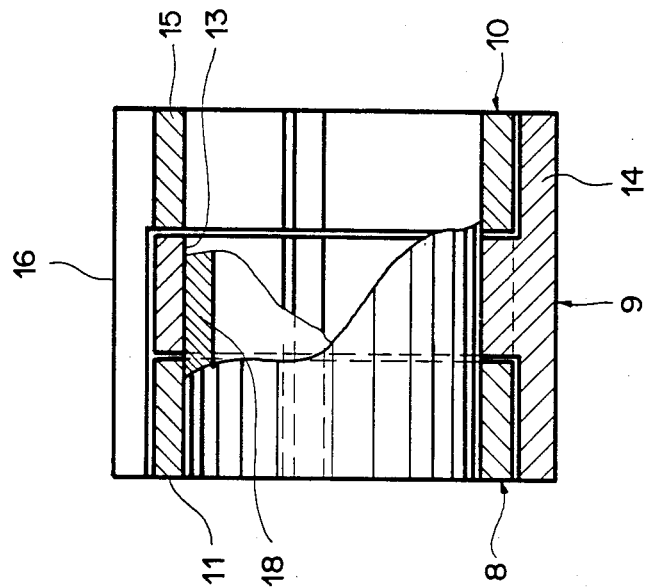
Figure 2:
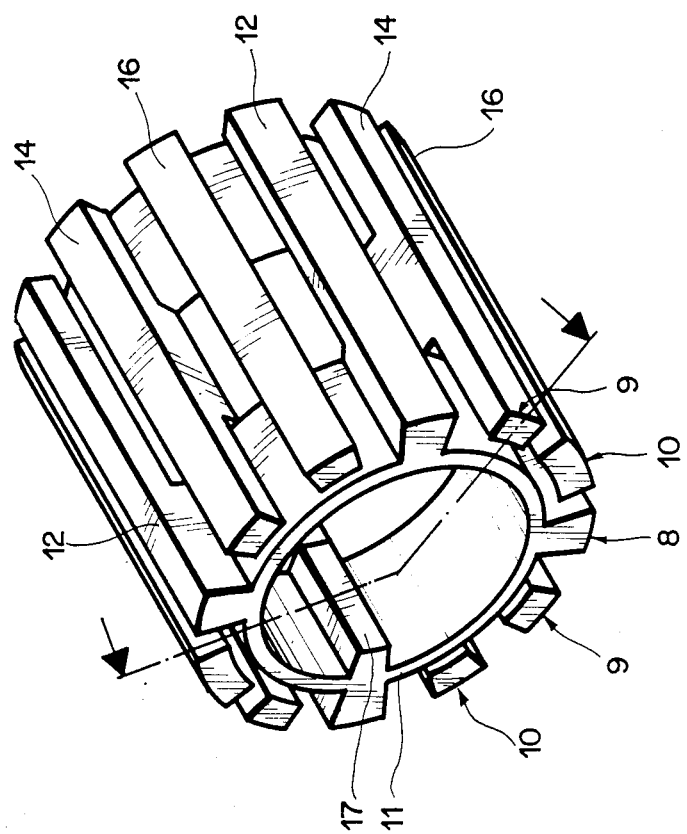
Figure 4:
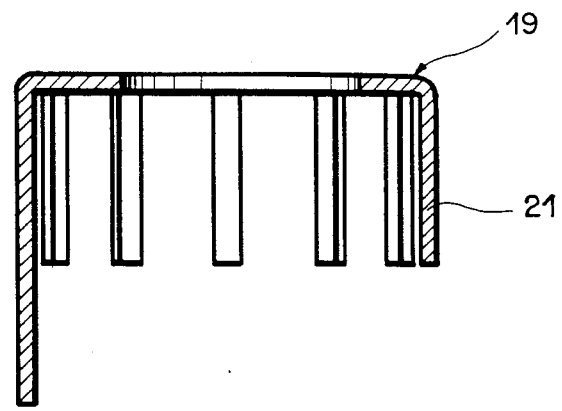
Figure 5:
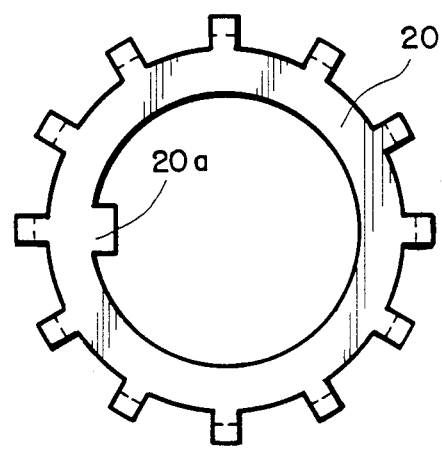
Figure 7:
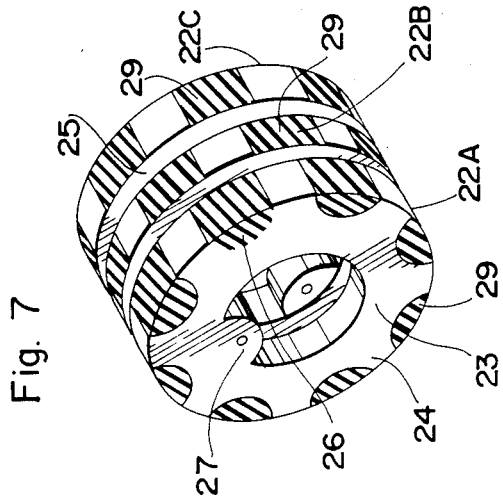
Figure 6:
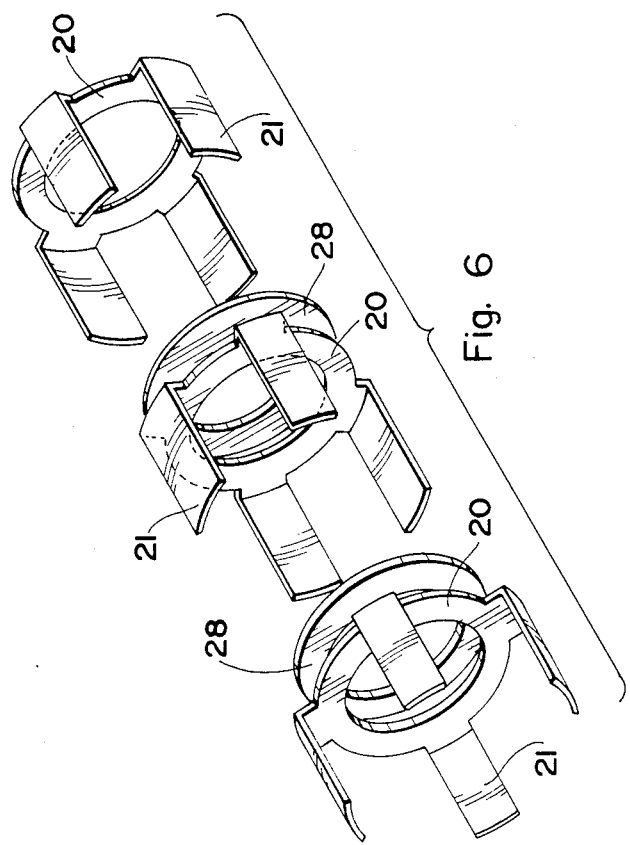

Other objects and advantages of the invention will become apparent from the following detailed description of preferred embodiments thereof, taken in conjunction with the accompanying drawings, in which:

FIG. 1 is a diagrammatic view of a DC motor having two pairs of poles and comprising a conventional-type commutator, FIGS. 2 and 3 are a perspective view and a partial axial section, respectively, of a commutator according to a first embodiment of the invention, FIGS. 4 and 5 are a section and an elevation, respectively, of an annular part in a second embodiment of the invention, FIG. 6 is an exploded diagrammatic perspective view showing the assembly of component parts of the second embodiment, and FIG. 7 is a diagrammatic perspective view illustrating the design of the commutator in a third embodiment of the invention.

The stator of a conventional DC motor is known to comprise pole pieces 1 distributed about the rotor and provided with pole shoes 2 from which the magnetic field of the stator crosses the space occupied by the rotor. The latter comprises a number of coils 3. The coils 3 may be borne by a stack of core plates, or instead may be wound on an air-core support. The two ends of each coil 3 are connected to two segments 4 of a commutator 5, against which brushes 6 rest. The diagram shown in FIG. 1 corresponds to the case of a motor having two pairs of poles, the rotor of which comprises three coils per pair of poles, i.e., a total of six coils, so that in this case, the commutator comprises six parallel segments 4. Moreover, it is necessary to establish connections between the pairs of homologous segments, such as connections 7, which will have the appearance shown in FIG. 1 when the rotor winding comprises coils in parallel according to the diagram depicted. A rotor winding formed of coils in series or any other type of winding may likewise be considered. In any case, the increase in the number of pairs of poles leads to the necessity of increasing the number of segments of the commutator and the number of connections between homologous segments, which considerably complicates the design of this part of the motor, above all when it is small.

FIGS. 2 and 3 show the principle of a commutator design for a motor having four pairs of poles (not shown), the rotor winding of which comprises three coils per pair of poles (not shown). The metal portion of the commutator is composed of three separate parts 8, 9, and 10, all three of annular shape. Part 8 comprises a first, ring-shaped portion or annular zone 11 of uniform thickness, the width of which is less than a third of total length of the commutator. Projecting from this annular zone 11 are four parts 12 distributed at 90° from one another and extending axially toward the right-hand side of FIG. 2 so as to form four commutator segments. Annular part 9 has the shape shown in FIG. 3, where it is seen to be disposed between and coaxial with parts 8 and 10. It also comprises an annular zone 13 identical to annular zone 11 of part 8 and, at four locations along the circumference of zone 13, four projecting portions 14 forming tongues extending to the right and left of zone 13. Finally, part 10 likewise comprises an annular zone 15 (FIG. 3), from which portions 16 constituting remaining segments project outwardly and axially. Each of the annular zones 11, 13, 15 further includes, on the inside, a rib 17 used for fitting and fixing the different parts relative to one another. In the embodiment illustrated here, parts 8, 9, and 10 are assembled by means of a tubular support 18 of plastic material which is fitted within the component parts of the commutator. Support 18 may be extended on one side or the other of the commutator in order to connect it to the rotor and, if need be, so that the rotor can be mounted on a separate shaft or bearings supporting the rotor can be put in place.

The winding of the rotor is not shown. The ends of the various coils will be welded to parts 8, 9, and 10 at the time of assembly. Moreover, the spaces between the segments may be filled with insulating material (not shown in FIGS. 2 and 3), e.g., a plastic material capable of solidifying after having been poured in as a liquid, solidification being brought about by polymerization.

As for the location and mounting of the brushes, these particularities need not be described in detail as they are completely conventional in this instance.

Whereas the manufacture of the different parts making up the commutator shown in FIGS. 2 and 3 would necessitate stamping or machining operations or, as the case may be, molding operations, the commutators forming part of second and third embodiments to be described below comprise annular components which can be made merely by blanking operations, accompanied by bending operations, if need be. These operations can be carried out on thin blanks of sheet metal, thus allowing the operations to be largely automated.

FIGS. 4 and 5 show in section and in front elevation, respectively, a component part 19 of a commutator in the second embodiment. This commutator is intended for a rotor having twelve pairs of poles (not shown) and comprising three coils per pair of poles. Component part 19 is obtained by blanking and bending, starting from a section of sheet silver, the thickness of which may, for example, be on the order of 0.3 mm. Part 19 comprises an annular zone 20 provided at one point of its inner periphery with a lug 20a. Along its outer periphery, part 19 is blanked with a series of radial fingers 21 which are then bent at right angles so as to extend axially. In this embodiment, the outside diameter of the commutator is 7 mm, and its length may vary from 2 to 5 mm, according to the model. To produce a complete commutator with three parts such as part 19, they are assembled as shown in FIG. 6, with insulating washers 28 being interposed. The assembly may be mounted on a tubular plastic part or embedded in an insulating material ensuring the cohesion of the parts. As in the first embodiment, the coils of the rotor winding will be welded to parts 19 when the rotor is being assembled.

FIG. 7 shows diagrammatically an assembly of three discrete annular parts 22 A, B, C that may likewise be of silver or of some other metal which is a good conductor of electricity and that are obtained simply by blanking operations. The three parts 22 A, B, C of FIG. 7 each include an annular zone 23 from which projecting portions 24 project. In FIG. 7, there are eight projecting portions 24 inasmuch as the commutator is intended for a motor having eight pairs of poles. In this embodiment, the projecting portions 24, intended to come into contact with the brushes upon rotation of the commutator, do not extend over the entire length of the commutator itself. As layers of insulating material 25 are interposed between the discrete annular parts 22 A, B, C, it will be apparent that the projecting portions 24 may be so dimensioned as to create an angular overlapping of the projecting zones which must commutate successively. The notches 26 existing between projecting portions 24 will therefore have inner peripheral lengths double the lengths of zones 24, and these notches can be filled with insulating material 20 which will eliminate the slots that cause noise or vibration of the brushes and accumulation of waste. Furthermore, the possibility of filling these notches with insulating material will allow the provision of a porous filling capable of retaining a certain lubricant reserve.

With this embodiment, it is also possible to dispose several brushes at different electrical angles along the periphery of the commutator, thus allowing devices for performing special additional functions to be mounted on the rotor. Thus, the design described above allows the provision, for example, of additional annular parts and corresponding brushes by means of which commutation can be controlled from outside as a function of time. It is well known that in the case of DC-type stepping motors, such commutation as a function of time represents the normal operation of the motor. By means of the design described above, it is therefore possible to produce stepping motors having a large number of pairs of poles and designed according to the mode of DC motors, something which has not been possible until now.

Finally, it will be noted that in the embodiment of FIG. 7, each of the parts 22 A, B, C is likewise provided with a projecting inner portion 27, this portion being intended to receive a pin (not shown) for connecting the part 22 A, B, C to the coils.

In the embodiments described above, the annular parts making up the commutator are of silver. They may also be of a silver-base alloy or of some other metal which is a good conductor, such as copper or palladium. In this case, they will be coated with a layer of gold, platinum, rhodium, or another metal of that type.

What is claimed is:

1. A DC motor comprising:
   a stator which includes a first number of pairs of poles regularly distributed around an axis; and
   a rotor which includes a commutator and a plurality of coils, the number of said coils being a second number equal to the product of an integer higher than one and said first number;
   said commutator comprising a plurality of integral rigid parts of a conducting metal, each of said integral rigid parts including an annular supporting portion and a group of elongated elements regularly distributed around said annular supporting portion, the number of elongated elements in said group being equal to said first number of pairs of poles of said stator, and the number of integral rigid parts being equal to said second number of coils per pair of poles;
   said annular supporting portions of said plurality of integral rigid parts being coaxial with the axis of said stator so that said elongated elements of said plurality of integral rigid parts are regularly distributed around said axis, said annular supporting portions being held in a fixed relationship with, spaced apart from and insulated from one another by insulating means.

2. The motor of claim 1, wherein each of said integral rigid parts is of uniform diameter throughout.

3. The motor of claim 2, wherein each said annular supporting portion is flat and is disposed perpendicular to the axis of said rotor, and said elongated elements of each said group are bent to extend parallel to said axis.

4. The motor of claim 3, wherein the annular supporting portions of said integral rigid parts are disposed parallel to one another and in the vicinity of one another at one end of said commutator, all of said elongated elements extending in the same direction from said annular supporting portions.

5. The motor of claim 2, wherein said integral rigid parts are flat rings mounted parallel to one another and oriented perpendicular to the common axis of said rings.

6. The motor of claim 5, wherein said flat rings have outer edges including indentations, said elongated elements of said integral rigid parts being bounded by said indentations.

7. The motor of claim 1, further comprising a tubular member of plastic material fitted within said annular support portions, said integral rigid parts being supported by said tubular member.

8. The motor of claim 1, wherein said integral rigid parts are made of a silver-base metal alloy.

* * * * *